United States Patent [19]

Schwitzgebel

[11] Patent Number: 5,106,508
[45] Date of Patent: Apr. 21, 1992

[54] INTEGRATED PROCESS FOR CYANIDE AND HEAVY METAL REMOVAL FROM PLATING PROCESS WASTE STREAMS

[76] Inventor: Klaus Schwitzgebel, 7507 Chminey Corners, Austin, Tex. 78731

[21] Appl. No.: 588,535

[22] Filed: Sep. 26, 1990

[51] Int. Cl.$^5$ ............................................. C02F 1/56
[52] U.S. Cl. ........................... 210/712; 204/DIG. 13; 210/720; 210/721; 210/725; 210/727; 210/756; 210/904; 210/912; 210/913; 210/919
[58] Field of Search ............... 210/717, 720, 721, 725, 210/726, 727, 732, 756, 757, 904, 912, 913, 919, 712; 204/DIG. 13

[56] References Cited

U.S. PATENT DOCUMENTS

| | | | |
|---|---|---|---|
| 2,640,807 | 6/1953 | Rice | 210/919 X |
| 3,736,239 | 5/1973 | George et al. | 210/919 X |
| 3,826,741 | 7/1974 | Nakamura | 210/904 X |
| 3,931,007 | 1/1976 | Sugano et al. | 210/717 |
| 4,157,942 | 6/1979 | Tuznik et al. | 423/55 |
| 4,169,053 | 9/1979 | Sakokibara et al. | 210/912 X |
| 4,176,060 | 11/1979 | Sury et al. | 210/904 X |
| 4,343,706 | 8/1982 | Etzel et al. | 210/667 |

FOREIGN PATENT DOCUMENTS

| | | | |
|---|---|---|---|
| 49-03467 | 1/1974 | Japan | 210/904 |
| 49-39264 | 4/1974 | Japan | 210/904 |
| 49-63254 | 6/1974 | Japan | 210/904 |
| 50-106455 | 8/1975 | Japan | 210/904 |
| 51-67672 | 6/1976 | Japan | 210/904 |
| 53-123559 | 10/1978 | Japan | 210/904 |

*Primary Examiner*—Peter Hruskoci
*Attorney, Agent, or Firm*—Joseph F. Long

[57] ABSTRACT

An integrated process for heavy metal and cyanide removal in aqueous waste stream from plating processes wherein cyanide is oxidized by hypochlorite at approximately pH of 11.5 and hexavalent chromium is reduced to trivalent chromium at ambient temperature with ferrous sulfate at pH of 9.5; excess hypochlorite from cyanide destruction reacts with ferrous sulfate and additional ferrous sulfate is added to reduce hexavalent chromium to trivalent chromium to allow hydroxide co-precipitation with hydroxides of the ferric iron and hydroxides of copper, chromium, zinc, cadmium, manganese, etc., which are then separated by settling and filtration.

3 Claims, 2 Drawing Sheets

INTEGRATED PROCESS FOR CYANIDE AND HEAVY METAL REMOVAL FROM PLATING PROCESS WASTE STREAMS

BACKGROUND OF THE INVENTION

Many countries of the world are becoming cognizant of the detrimental effect on the environment of uncontrolled discharge of heavy metals and cyanides of metals. Cyanides have been known as potent poisons for many years.

A simple continuous process for destruction of cyanides and heavy metal precipitation would allow many small plating operators to treat their waste streams on-site and recover the heavy metals for recycle or for safe landfill. All common heavy metals except hexavalent chromium easily precipitate as hydroxides with optimum alkalinity for individual precipitation varying from a pH of about 7.5 to 13.

This invention encompasses the use of excess ferrous sulfate to reduce hexavalent chromium to trivalent chromium which then may be precipitated along with cadmium, zinc, arsenic, ferric iron, lead, nickel, copper, etc., as hydroxides. Further, we have found that all of these metals will coprecipitate completely with ferric iron, as hydroxides, at a pH of 9.5, to leave very low levels of heavy metals in solution. Our process combines a hypochlorite oxidation to destroy cyanides in a manner to allow destruction of excess hypochlorite by ferrous sulfate oxidation, with more ferrous sulfate then being added for hexavalent chromium reduction. These reactions occur simultaneously in one reactor at pH of approximately 9.5. In this manner ferric ions to allow optimum hydroxide formation to co-precipitate with the other heavy metals are also formed and variations in amount of hexavalent chromium are accomodated.

We have considered the following patents:

| Patent No. | Inventor | Date |
|---|---|---|
| 3,931,007 | Sugano et al. | 1/6/1976 |
| DL. 85032 R | Schulz, G. | 8/12/1970 |
| 4,343,706 | Etzel et al. | 8/10/1982 |
| 4,169,053 | Sakakibaro et al. | 9/25/1979 |
| 82354w/50 | Takeda Chem. Ind. | 11/5/1973 |

None of the above patents cover an integrated process for both cyanide destruction and heavy metal removal.

SUMMARY OF THE INVENTION

We have developed a treatment process wherein hexavalent chromium is reduced to trivalent chromium and chromium and other heavy metals are precipitated as hydroxides. Cyanides are destroyed in a first vessel by adding caustic to a pH of approximately 11.5 and by adding sodium or calcium hypochlorite to maintain approximately 300 mV as measured by platinum-calomel electrodes; chromium is reduced and heavy metals precipitated by feeding non-cyanide containing waste streams along with overflow from the first cyanide treatment vessel to a second vessel wherein pH is adjusted to approximately 9.5 and ferrous sulfate is added to a 16 mV. Reactions in the first vessel and second vessel were carried out at ambient temperature and with approximately a twenty minute hold-up time.

In this second vessel the ferrous sulfate reacts with hexavalent chromium as follows:

$$Fe\,SO_4 + 2\,Na\,OH \rightarrow Na_2SO_4 + Fe(OH)_2$$
$$3\,Fe(OH)_2 + CrO_4 + 2H_2O \rightarrow 3\,Fe(OH)_3 + Cr(OH)_3$$

Trivalent chromium precipitates easily as a hydroxide. We have found that by maintaining the pH at approximately 9.5 co-precipitation of ferric sulfate along with the other heavy metals including the trivalent chromium leads to optimum heavy metal removal. The ferric ion is preferable to the ferrous ion for the hydroxide co-precipitation and in streams wherein hexavalent chromium is not present the excess hypochlorite produce ferric sulfate from the ferrous sulfate added to give this ferric ion.

It appears that excess hypochlorite from the first vessel is used up when ferrous sulfate is added in the second vessel by formation of ferric sulfate; additional ferrous sulfate is then required to reach the $-16$ MV oxidation reduction potential to reduce the hexavalent chromium to trivalent chromium. Simultaneously at pH 9.5 co-precipitation of trivalent chromium and other heavy metals is occurring. A flocculation polymer may be added to the hydroxide co-precipitate to aid in settling. Precipitation of the heavy metals as outlined reduced the amount of heavy metals that would normally be soluble by two orders of magnitude.

Using the process as outlined actual plant data are shown for July 24 and July 25, Table 1.

TABLE 1

| | Plating Waste Streams - July 24th and July 25th | | | | | |
|---|---|---|---|---|---|---|
| | Day 1 July 24 | | | Day 2 July 25 | | |
| Metal | Rinse Stream (ppm) | Cyanide Feed Stream (ppm) | Effluent | Rinse Stream (ppm) | Cyanide Feed Stream (ppm) | Effluent |
| As | | | | | | |
| Ba | | | | | | |
| B | | | | | | |
| Cd | <0.01 | <0.01 | <0.01 | <0.01 | <0.01 | <0.01 |
| Cs | 0.7 | <0.06 | <.06 | 0.7 | <0.06 | <0.06 |
| Cu | 0.74 | 1.38 | 0.22 | 1.77 | 2.22 | 0.20 |
| CN | 0.02 | 16.8 | 0.16 | 0.12 | 29.60 | 0.04 |
| Pb | <0.09 | <0.09 | <0.09 | <0.09 | <0.09 | <0.09 |
| n | | | | | | |
| Hg | | | | | | |
| Ni | 4.50 | <0.05 | <0.05 | 4.57 | <0.05 | <0.05 |
| Se | | | | | | |
| Ag | <0.02 | <0.02 | <0.02 | <0.02 | <0.02 | <0.02 |
| Zn | 1.36 | 1.29 | 0.04 | 1.11 | 2.09 | 0.04 |
| pH | 6.90 | 7.50 | 9.60 | 6.90 | 7.60 | 9.60 |

Subsequent plant data indicated the following concentrations in the effluent stream of arsenic, barium, manganese, mercury and selenium:

| Metal | Effluent Concentration |
|---|---|
| Arsenic | <0.01 ppm |
| Barium | <0.70 ppm |
| Manganese | <0.04 ppm |
| Mercury | <0.02 ppm |
| Selenium | <0.00 ppm |

These actual plant data indicate removal of cadmium, copper, cyanide, lead, nickel, silver and zinc to levels well below governmental requirements for safe disposal.

DETAILED DESCRIPTION OF THE DRAWINGS

Figure 1:
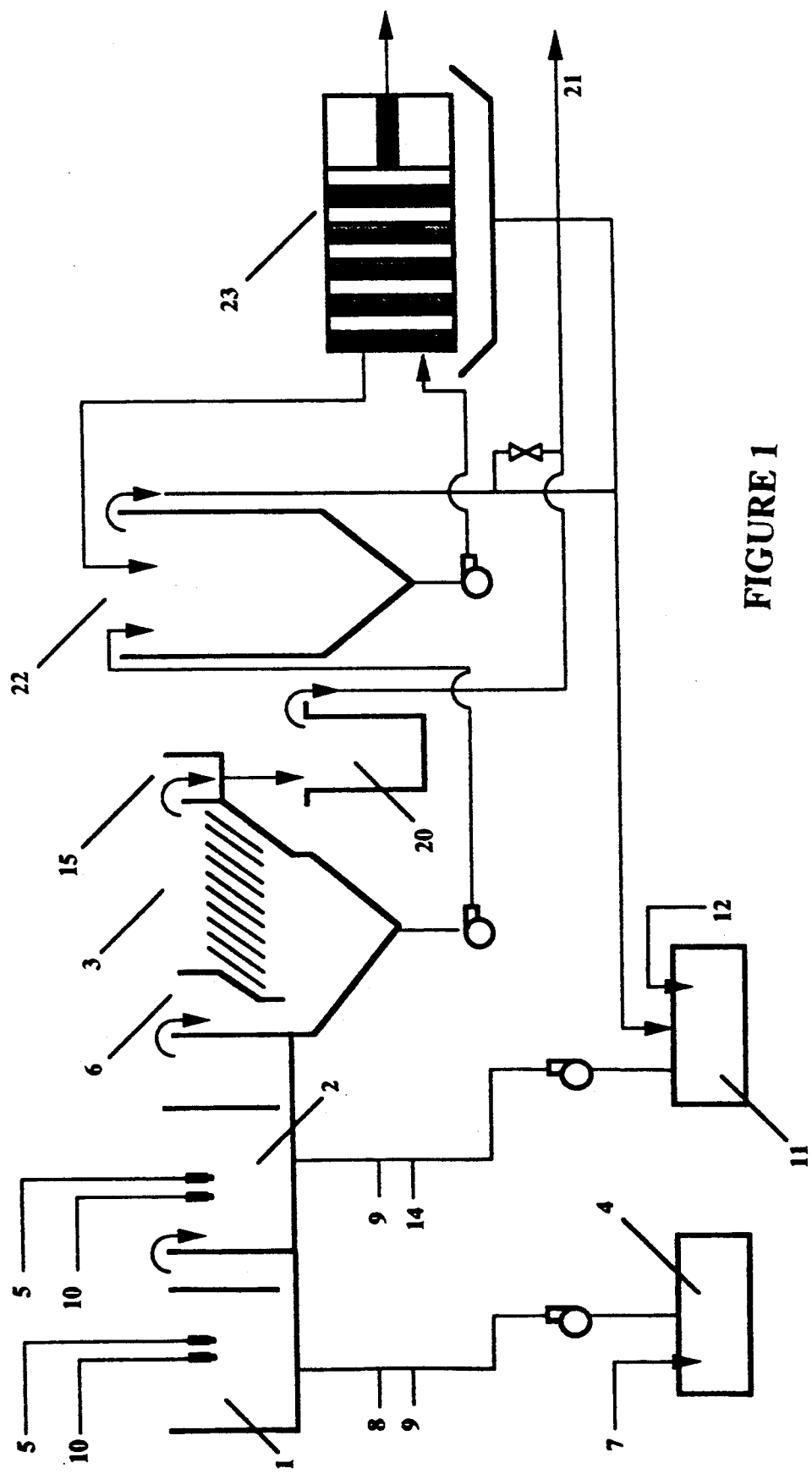
FIG. 1 shows a preferred embodiment wherein a three compartment vessel feeds precipitated hydroxides through a sludge tank and filter press.

The invention may be described in more detail most easily by referring to the drawings.

In FIG. 1 we show one preferred embodiment of equipment that may be used for carrying out the process. A cyanide containing waste stream 7 from hold up tank 4 is fed into a first stirred reactor 1 wherein a pH controller 10 controls caustic feed 9 to maintain pH of approximately 11.5 and a platinum - calomel electrode 5 controls sodium or calcium hypochlorite addition 9 to maintain oxidation - reduction potential at about 300 MV.

Overflow from reactor 1 goes to a 2nd stage stirred reactor 2 along with a non-cyanide containing heavy metal waste stream 12 fed from hold up tank 11. Caustic 9 is controlled by pH controller 10 to maintain pH 9.5 while ferrous sulfate 14 is controlled by a platinum - calomel electrode 10 to maintain −16 mV. In this reactor, excess hypochlorite is used up by reaction with ferrous sulfate to form ferric sulfate and further ferrous sulfate is added to reduce hexavalent chromium to trivalent chromium. Trivalent chromium, heavy metals such as lead, zinc, arsenic, cadmium, copper, nickel, etc., and ferric sulfate all co-precipitate essentially completely at the pH of 9.5. Variations in levels of hexavalent chromium and variations in excess hypochlorite will require variations in ferrous sulfate that will be made by millivolt control of the ferrous sulfate addition. Note that other ferrous salts such as ferrous chloride should be suitable. Note that the excess hypochlorite from the cyanide reactor forms the ferric ion from the ferrous ion added. The ferric ion is desireable to form the hydroxide coprecipitate with other heavy metals. When the heavy metals are co-precipitated with ferric hydroxide at pH 9.5 we find 10 to 100 fold less metal left in solution than would be predicted by known hydroxide solubilities.

In stirred compartment 6 of the clarifier 3 a flocculation polymer may be added to improve settling of the heavy metal hydroxides. Clarified overflow from clarifier 3 collects in collector ring 15 and drains into check tank 20 which overflows to clarified treated waste discharge through line 21. If the treatment is upset this stream may be recycled back to feed tank 11. Bottoms or sludge from the clarifier 3 are pumped to sludge hold-up tank 22. Overflow from this tank recycles to feed tank 11 and bottoms are fed through filter 23 which may be a plate and frame filter or any of several commercial filters. Cake or metal hydroxides from the filter may be landfilled and filtrate from the filter may be recycled to feed hold-up tank 11.

Figure 2:
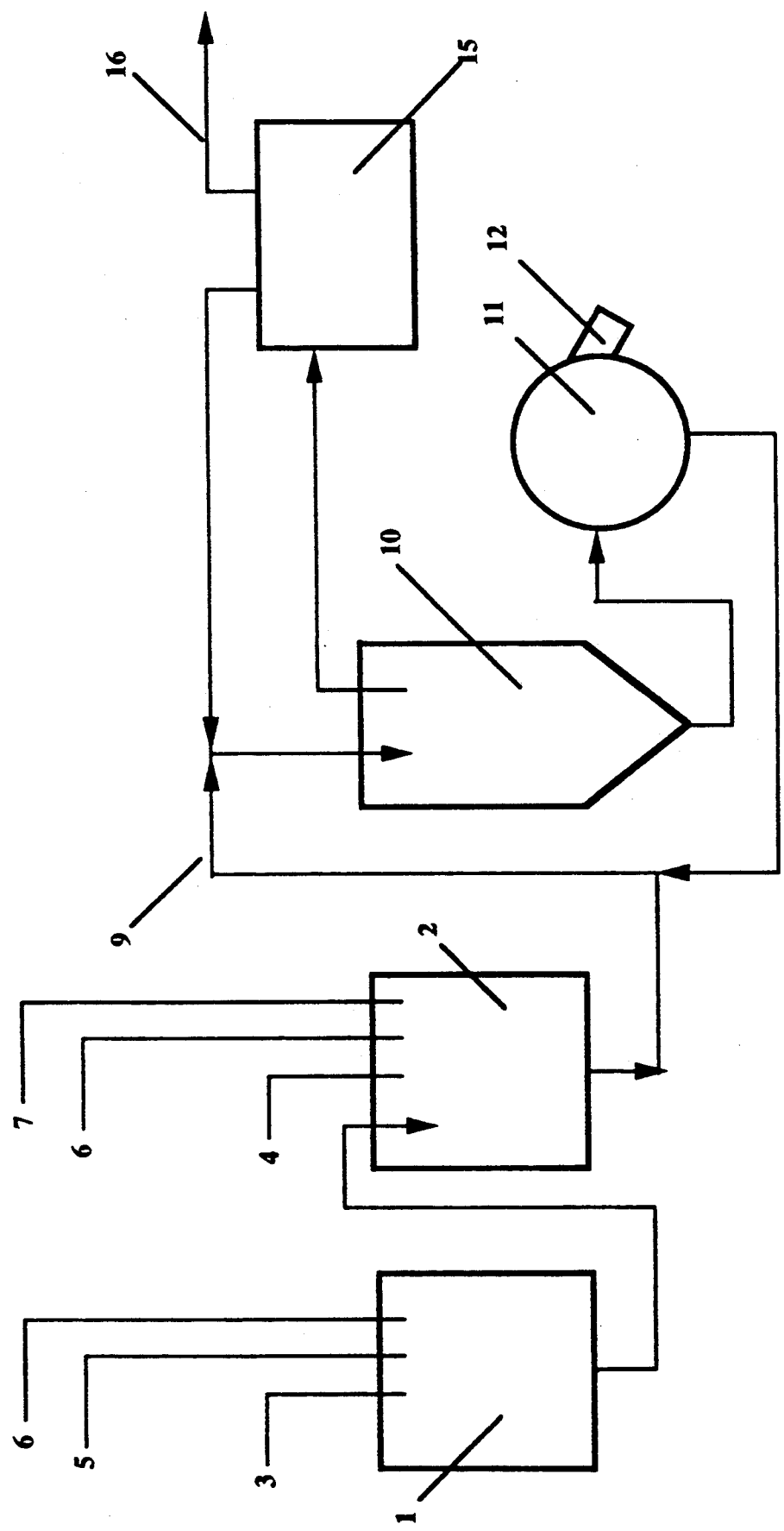
FIG. 2 shows a second embodiment wherein separate reactor vessels feed to a clarifier which has an overflow to the aqueous waste discharge and sludge draw off to continuous filter.

FIG. 2 shows in more simplified form equipment that may be used for carrying out the same process where large volume flows are encountered. In stirred reactor 1, with a minimum of a twenty minute hold-up time for a cyanide containing feed stream 3, caustic 6 is added to maintain pH at approximately 11.5 and sodium hypochlorite is added to 300 mV as measured by a platinum-calomel electrode. A heavy metal aqueous waste stream 4 is fed into stirred reactor 2 along with effluent from reactor 1. Reactor 2 is sized to have a minimum of a twenty minute hold-up. Caustic 6 is fed to maintain a pH of approximately 9.5 and ferrous sulfate is added to a −16 mV as measured by a platinum-calomel electrode. Several reactions are occurring simultaneously in reactor 2. First excess hypochlorite from reactor 1 reacts with ferrous sulfate, then additional ferrous sulfate reduces hexavalent chromium to trivalent chromium which then precipitates as a hydroxide along with other heavy metals and ferric sulfate formed by reactions of the ferrous sulfate.

A flocculation polymer 19 may be added to effluent from reactor 2 as the effluent enters a clarifier 10. Overflow from clarifier 10 goes to check tank 15 and out line 16 to treated waste water discharge. Underflow or sludge from the clarifier feeds a filter 11 such as a rotary drum filter with precipitated metal hydroxide discharge 12 which ma be landfilled or recycled to smelters. Filtrate 13 recycles back to the clarifier.

The hydroxide sludge formed with the ferric co-precipitate under conditions we have outlined holds all heavy metals tightly enough that using the standard EPA leaching test at pH of 5 less than 1 ppm of heavy metals was leached out as shown in the following actual data:

| EPA Leaching Test @ pH 5 | |
| --- | --- |
| As | <0.01 |
| Se | <0.006 |
| Hg | <0.02 |
| Cd | <0.01 |
| Cr | <0.06 |
| Pb | <0.06 |
| Ba | <0.7 |
| Ag | <0.02 |

Legend

FIG. 1
1 = 1st compartment
2 = 2nd compartment
3 = clarifier
4 = hold-up for cyanide containing waste
5 = platinum calomel electrode
6 = stirred compartment
7 = cyanide containing feed stream
8 = sodium hypochlorite
9 = caustic or sodium hydroxide
10 = pH controller
11 = heavy metal waste hold-up tank
12 = heavy metal waste stream
14 = ferrous sulfate addition
15 = check tank for treated waste water
20 = check tank for discharge water
21 = overflow to sewer
22 = sludge hold-up tank
23 = filter FIG. 2
1 = 1st stirred reactor
2 = 2nd stirred reactor
3 = cyanide containing waste water
4 = non-cyanide containing heavy metal waste
5 = sodium or calcium hypochlorite
6 = caustic
7 = ferrous sulfate 10=clarifier
11=filter
12=solid discharge
13=filtrate recycle
15=check tank for treated waste water
16=treated waste water discharge
19=flocculation polymer

What is claimed is:

1. A process for heavy metal and cyanide removal in aqueous waste streams from plating processes comprising:
   a) feeding cyanide containing aqueous waste into a stirred first reactor;
   b) adding caustic and a hypochlorite solution with stirring to said first reactor to maintain an oxidation - reduction potential of approximately 300 mV and pH at approximately 11.5, thereby destroying cyanide in said cyanide containing aqueous waste stream and producing an overflow including excess hypochlorite;
   c) combining said overflow from said first reactor with a non-cyanide heavy metal containing waste stream including hexavalent chromium and feeding a combined stream into a stirred second reactor;
   d) feeding caustic and ferrous sulfate solution with stirring into said second reactor to maintain pH at approximately 9.5 and an oxidation reduction potential at approximately −16 mV, wherein simultaneously said excess hypochlorite is destroyed, said hexavalent chromium is reduce to trivalent chromium, and an overflow containing ferric ion and heavy metal precipitates is produced;
   e) overflowing from said second reactor said overflow to a clarifier vessel while adding a solution of a flocculation polymer to produce an aqueous waste water discharge and sludge;
   f) overflowing from said clarifier said aqueous waste water discharge, wherein said first and second reactors and said clarifier are maintained at ambient temperature;
   g) pumping sludge from said clarifier through a filtration unit with filtrate from said filtration unit returning to said non-cyanide containing waste stream being combined, and discharging metal cake containing heavy metals co-precipitated from said non-cyanide heavy metal containing waste stream and said cyanide contaminating aqueous waste stream.

2. A process for heavy metal and cyanide removal in aqueous waste stream from plating processes as in claim 1 wherein said first and said second reactors are sufficient size to afford a minimum of twenty minutes holdup when said cyanide containing waste stream and said non-cyanide heavy metal containing waste stream are fed on a continuous basis and wherein said clarifier is of sufficient size that velocity of upward flow of clarified liquid is less than one half the settling velocity of said sludge.

3. A process for heavy metal and cyanide removal in aqueous waste streams from plating processes comprising:
   a) feeding a cyanide containing waste stream into a first compartment of a three compartment reactor;
   b) adding caustic and hypochlorite solution with stirring into said first compartment to maintain pH at approximately 11.5 and an oxidation reduction potential of approximately 300 mV, thereby destroying cyanide in said cyanide containing waste stream and producing an underflow including excess hypochlorite;
   c) combining said underflow from said first compartment with a non-cyanide heavy metal containing waste stream including hexavalent chromium and feeding to a second stirred compartment of said three compartment reactor;
   d) adding caustic and ferrous sulfate solution to said second stirred compartment to maintain pH at approximately 9.5 and an oxidation-reduction potential of approximate −16 mV, thereby simultaneously destroying said excess hypochlorite and converting said hexavalent chromium in said non-cyanide, heavy metal containing waste stream to trivalent chromium thereby co-precipitating said trivalent chromium and the other heavy metals with ferrous ions from said ferrous sulfate and with ferric ions formed by reaction of said excess hypochlorite with ferrous ions to produce an underflow;
   e) underflowing from said second compartment said underflow to a third stirred compartment of said three compartment reactor while adding a flocculation polymer and producing an underflow;
   f) gravity flowing said underflow from said third stirred compartment to a clarifier tank, wherein said three compartment reactor and said clarifier tank are maintained at ambient temperature;
   g) overflowing from said clarifier tank a waste water discharge;
   h) pumping a sludge slurry from said clarifier tank thru a filtration unit to separate sludge for disposal; said sludge containing heavy metals co-precipitated from said non-cyanide, heavy metal containing waste stream and said cyanide containing waste stream.

* * * * *